(12) United States Patent
Kim

(10) Patent No.: US 7,973,764 B2
(45) Date of Patent: Jul. 5, 2011

(54) SWITCHING BETWEEN INPUT MODES IN A LIMITED INPUT DEVICE

(75) Inventor: Jong Hwan Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 973 days.

(21) Appl. No.: 11/445,869

(22) Filed: Jun. 2, 2006

(65) Prior Publication Data

US 2006/0290660 A1 Dec. 28, 2006

(30) Foreign Application Priority Data

Jun. 2, 2005 (KR) .......................... 10-2005-0047453

(51) Int. Cl.
*G09G 5/08* (2006.01)
(52) U.S. Cl. .......................... 345/157; 345/168; 715/708
(58) Field of Classification Search .......... 345/156–184; 455/565, 566; 715/203, 223, 226, 708, 810, 715/864
See application file for complete search history.

(56) References Cited

U.S. PATENT DOCUMENTS

| | | | | |
|---|---|---|---|---|
| 4,393,463 A | * | 7/1983 | Aiken, Jr. ....................... | 715/210 |
| 5,128,672 A | * | 7/1992 | Kaehler ........................... | 341/23 |
| 5,413,420 A | * | 5/1995 | Ishida et al. ..................... | 400/61 |
| 6,442,523 B1 | * | 8/2002 | Siegel ............................. | 704/270 |
| 6,826,413 B1 | * | 11/2004 | Nakatsuchi et al. ........ | 455/553.1 |
| 2002/0054135 A1 | * | 5/2002 | Noguchi et al. ................ | 345/788 |
| 2004/0085370 A1 | * | 5/2004 | Cibelli et al. .................. | 345/864 |
| 2004/0179044 A1 | * | 9/2004 | Carter et al. .................... | 345/865 |
| 2005/0091577 A1 | * | 4/2005 | Torres et al. ................... | 715/507 |
| 2005/0184999 A1 | * | 8/2005 | Daioku ........................... | 345/589 |

FOREIGN PATENT DOCUMENTS

| | | | |
|---|---|---|---|
| JP | 07182335 A | * | 7/1995 |
| JP | 1997-185618 | | 7/1997 |
| KR | 10-2002-0021589 | | 3/2002 |
| KR | 10-2005-0042409 | | 5/2005 |
| KR | 10-2005-0053916 | | 6/2005 |

OTHER PUBLICATIONS

Translation of [JP, 07-182335] published on Jul. 21, 1995.*

* cited by examiner

*Primary Examiner* — Abbas Abdulselam
*Assistant Examiner* — Dmitriy Bolotin
(74) *Attorney, Agent, or Firm* — Lee, Hong, Degerman, Kang & Waimey

(57) ABSTRACT

The present invention is directed to a method for switching a data entry mode, when editing data displayed on a limited input device. The method comprises evaluating a first input point, in relation to a second input point, positioned in an input window of the limited input device, wherein the first point is associated with a first data entry mode and the second input point is associated with a second data entry mode.

15 Claims, 6 Drawing Sheets

SWITCHING BETWEEN INPUT MODES IN A LIMITED INPUT DEVICE

CROSS-REFERENCE TO RELATED APPLICATION

This application claims the benefit of the Korean Patent Application No. 10-2005-0047453, filed on Jun. 2, 2005, which is hereby incorporated by reference as if fully set forth herein.

FIELD OF THE INVENTION

The present invention relates to the field of data entry into a limited input device. More specifically, the present invention is directed to a method and system for switching the data entry mode, without requiring user interaction, when editing data displayed on a limited input device.

BACKGROUND

Generally, the developmental trend in personal communication technology is toward the use of limited input devices such as Internet phones, IMT-2000 phones, PDAs (personal digital assistants), cellular phones, and the like.

Some limited input devices are equipped with voice communication services and various data transmission services such as SMS/LMS/MMS (short/long/multi message services). Often data transmission is more convenient and economical than voice communication. This has caused an increase in popularity of data transmission services such as those noted above.

Due to their nature and design, limited input devices are not equipped with unique data entry keys for all alphanumeric characters and symbol characters that PC's and other communication devices are equipped with. To address this problem, data entry keys on limited input devices are associated with multiple data entry modes. Users can enter alphanumeric characters when the device is in alphanumeric mode, and symbolic characters when in symbolic mode. By allowing the user to switch modes when desired, limited input devices can provide users with a full set of alphanumeric and symbolic characters despite having a limited set of data entry keys.

Many limited input devices allow the character data to be edited. A point of entry also known as a curser can be positioned in an appropriate area in an edit window, so that characters can be erased, or new characters can be added. When adding characters, if the device is not in the proper input mode, the user must first shift the data entry keys into the appropriate input mode and then enter the desired data.

Shifting the data entry keys into the appropriate mode is an additional step the user must manually complete. This additional step slows the editing process and is an inconvenience that users of limited input devices must endure to edit a message that includes a mixture of alphanumeric and symbolic data.

Systems and methods are needed that can overcome the above-noted problems.

SUMMARY OF THE INVENTION

The present invention is directed to a method for switching data entry mode, when editing data displayed on a limited input device. The method comprises evaluating a first input point, in relation to a second input point, positioned in an input window of the limited input device, wherein the first input point is associated with a first data entry mode and the second input point is associated with a second data entry mode.

The method further comprises switching from the second data entry mode to the first data entry mode without requiring user interaction with the limited input device, in response to determining that the first and second data entry modes differ in at least one input attribute. The at least one input attribute may define a style of an input character to be entered in the second input point, for example.

In one embodiment, the first input point immediately precedes the second input point. The second input point may be illustrated by a cursor. In another embodiment, in the first data entry mode, a user interacts with a user interface mechanism of the limited input device to edit text displayed in the input window. The first data entry mode can be an alphabetic input mode, for example. The second data entry mode can be a numeric input mode, or a non-alphanumeric input mode, for example.

In certain embodiments, the at least one input attribute may define a font of an input character to be entered in the second input point, a color of an input character to be entered in the second input point, or whether an input character to be entered in the second input point belongs to a class of numeric characters, for example.

In one or more embodiment, the at least one input attribute defines whether an input character to be entered in the second input point belongs to a class of alphabetic characters, or a class of symbol characters, for example. The limited input device may be a mobile communication unit, in accordance with an exemplary embodiment.

In accordance with another aspect of the invention, a limited input device comprises an edit window for editing data inputted by a user to the limited input device; a first input point preceding a second input point positioned in the edit window; and a user interface mechanism for allowing the user to select an input point in the edit window.

The first input point is associated with a first data entry mode and the second input point is associated with a second data entry mode. The second data entry mode is switched to the first data entry mode without requiring user interaction with the user interface mechanism, in response to determining that the first and second data entry modes differ in at least one input attribute.

In accordance with yet another aspect of the invention, a computing device readable medium comprising executable logic code is provided. Execution of the logic code on a controller of a limited input device causes the controller to evaluate a first input point, preceding a second input point, positioned in an input window of the limited input device, wherein the first input point is associated with a first data entry mode and the second input point is associated with a second data entry mode; and switch from the second data entry mode to the first data entry mode without requiring user interaction with the limited input device, in response to determining that the first and second data entry modes differ in at least one input attribute.

It is to be understood that both the foregoing general description and the following detailed description of the present invention are exemplary and explanatory and are intended to provide further explanation of the invention as claimed.

BRIEF DESCRIPTION OF THE DRAWINGS

Reference will now be made in detail to the preferred embodiments of the present invention, examples of which are illustrated in the accompanying drawings. Wherever possible, the same reference numbers will be used throughout the drawings to refer to the same or like parts.

DETAILED DESCRIPTION OF PREFERRED EMBODIMENTS

One exemplary embodiment is described in the following as applicable to editing a message comprising alphanumeric and symbolic characters inputted to a limited input device. This exemplary embodiment should not be construed, however, to limit the scope of the invention to such application. Depending on implementation, other embodiments may be directed to other functions and applications (e.g., a scheduler function, an alarm function, a commemoration day function, a memo function, etc.) for editing content including characters or other editable objects (e.g., graphics, multimedia, etc.)

In accordance with one aspect of the invention, in character mode, a user can input and edit different characters defined by a character attribute. A character attribute can define the language, shape, special effects, type, style, size, color and other qualities associated with an inputted character. The language can for example include a native language (e.g., Korean, Chinese, Japanese, English, German, Italian, French, Spanish, etc.)

In one input mode, a character attribute may define whether the character is an alphabet, numeric, or symbolic character, for example, or whether an input character should be capitalized. Thus, in certain embodiments, a capital mode and a non-capital mode may be associated with a character.

For the purpose of simplicity and providing a more detailed disclosure, the following modes are discussed by way of example: a native language mode, an English capital letter mode, an English small letter mode, a figure mode and a special character mode.

In accordance with an exemplary embodiment, a cursor in an edit window of a limited input device can be represented by any of the various types of special symbols or characters (e.g., an underline, a rectangular box) that, for example, flash on and off to indicate the input point on the edit window in an input mode. In one or more embodiments, a character selection signal represents any of various types of signal received via a keypad or a touch screen which is selected in order to input a character.

Figure 1:
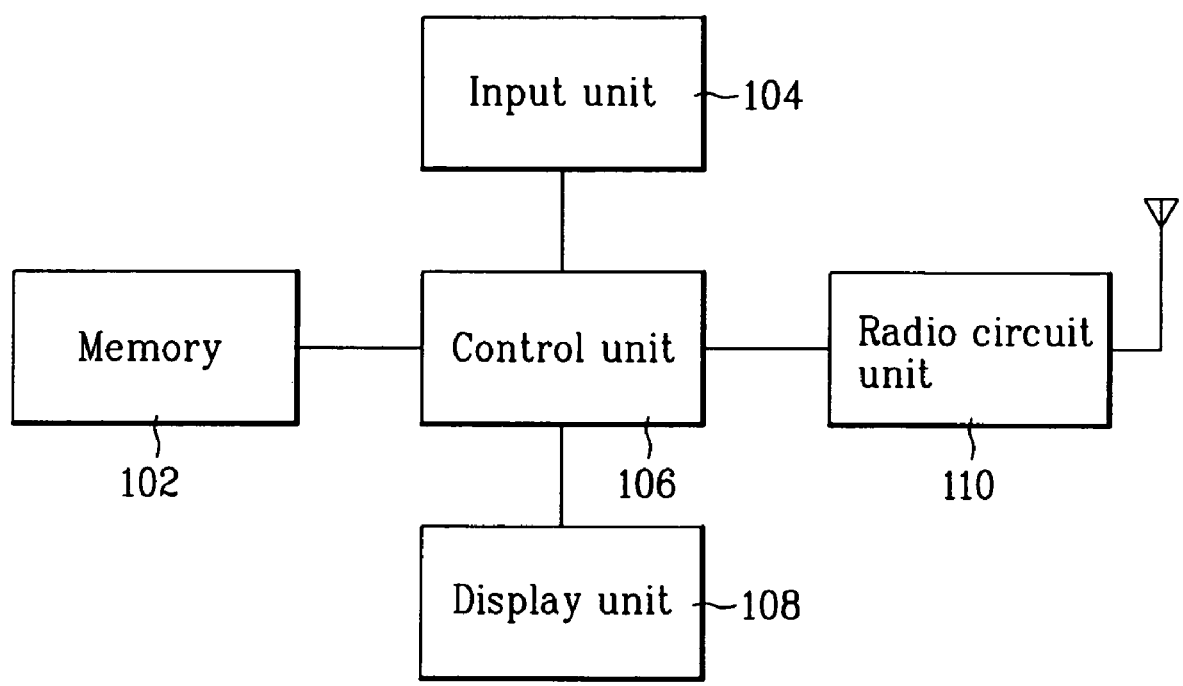
FIG. 1 is a schematic block diagram of an inner configuration of a limited input terminal according to one embodiment.

Referring to FIG. 1, a limited input device according to an embodiment of the present invention comprises a memory 102, an input unit 104, a control unit 106, a display unit 108, and a radio circuit unit 110. The limited input device may be a PDA, a cellular phone, a PCS phone, a GSM phone, a W-CDMA phone, a CDMA-2000 phone, a MBS phone, a DMB phone or any other type of input device with a limited keypad or limited user interface feature which provides different input modes for editing data in an edit window of the device, as provided above.

The memory 102 stores software that controls the overall operation of the limited input device, in addition to inputted/outputted data. The overall operation of the limited input device is carried out by the control unit 106, according to instructions provided by the software. In accordance with one embodiment, the memory 102 stores data in association with a character mode, by maintaining a character set based on a request from the control unit 106.

In an exemplary embodiment, the character sets may include ASCII code, Korean complete code, Korean combination code, for example. In other embodiments, the character set can further include codes suitable for countries for which the limited input device is designed. For instance, ISO-8859-1 to ISO-8859-15 codes (used in Europe), EUC-JP or SHIFT_JTS codes (associated with Japanese), GB-2312 or BIG-5 codes (associated with Chinese), and Uni-code (devised to support all characters) may be used.

In one embodiment, the input unit 104 comprises a plurality of keys or buttons to input alphanumeric, symbolic or other types of data depending on the mode selected by a user. In certain embodiments, input unit 104 may also comprise a keypad, a jog shuttle, point stick, touch screen or other functional equivalents for entering data into or interfacing with an edit window of the limited input device.

In another embodiment, the input unit 104 generates a signal that is provided to the control unit 106, in response to a user inputting a character to the device. If a user moves a position of a cursor using, for example, a direction key, a side key or a cancel (erase or delete) key, the input unit 104 generates a corresponding signal provided to the control unit 106. If the input unit 104 includes a touch screen, the input unit 104 may provide a signal to the control unit 106 when a user interacts with the touch screen to change the cursor position.

The display unit 108 may comprise a liquid crystal display unit that displays various kinds of information. The display unit 108 informs a user of a current state of a terminal by displaying the corresponding state. The display unit 108 displays various kinds of information such as battery status, reception intensity of radio wave, date and time, current mode, or other information.

The display unit 108 according to one aspect of the invention displays a message input window (i.e., edit window), in response to a user selecting an option from a message input menu. The display unit 104 receives a character inputted via the input unit 104 by the user from the control unit 106 and then displays the received character on the message input window.

The display unit 108 may display a character and a cursor according to a signal received from the control unit 106. When the cursor changes position, the display unit 208 may display the cursor on a designated position according to a control signal received from the control unit 106.

The radio circuit unit 110 is a transceiver circuit to enable voice and control information to be wirelessly exchanged with a base station. The radio circuit unit 110 receives a signal transmitted from an external limited input device or a base station via antenna and then transfers the received signal to the control unit 106 or outputs data stored in the memory 102 via the antenna. The radio circuit unit 110 transmits an inputted character message to a mobile communication network via the antenna.

The control unit 106 is configured to control the overall operation of the limited input device. The control unit 106 may for example comprise an arithmetic and logic unit, a register, a program counter, a command decoder, and a control circuit.

According to one embodiment, the control unit 106 determines the cursor position in response to receiving a cursor shift request signal via the input unit 104, identifies a mode of a character displayed in the vicinity of the shifted cursor, and then changes a current character mode into a mode of the identified character.

In one embodiment, in response to receiving a cursor shift request signal, the control unit 106 generates a control signal to move the cursor according to the cursor shift request signal on the display unit 108. The cursor shift request signal may be inputted by a direction key, a delete key, an erase key, or a cancel key for example. If the display unit includes a touch screen, the cursor shift request signal can be inputted by touching the screen.

In one or more embodiments, the control unit 106 may generate a control signal to enlarge the size of the character for example. The control unit 106 can identify a character mode type by checking a code associated with the character displayed in the vicinity of the cursor. In one embodiment, when the most significant bit ('MSB') of the associated code is equal to a first value (e.g., '0'), for example, the character is identified as a figure, an English capital letter or an English small letter, for example.

If the most significant bit is equal to a second value (e.g., '1'), the character is identified as a native language (Korean, Japanese, Chinese, French, German, etc.). In other embodiments, other methods may be used to identify a character's mode. If a character located in the vicinity (e.g., before or after) of a cursor is identified as a space character, the control unit 106 identifies a mode of a character located before the space character. For example, if a character located before a cursor is a space character, the control unit 106 identifies the mode based on the character located after the cursor. Alternatively, if a character located after a cursor is a space character; the control unit 106 identifies the mode based on the character located before the cursor.

Having identified the mode of the character in the vicinity of the cursor, the control unit 106 switches between a current character mode and the identified character mode. For example, if a user shifts a cursor in the course of inputting English capital letters, the control unit 106 switches from a character mode to a figure mode, if a character located before the shifted cursor is identified as a figure.

Or, for example, if the identified mode is a special character mode, the control unit 106 can output character table data of special characters received from the memory 102 to the display unit 108. If a plurality of character tables exists, a character table including the special character displayed before the cursor may be outputted. Depending on implementation, if a mode of an identified character is a special character (e.g., a space), the control unit 106 identifies a mode of a character located before the special character and then changes the special character mode into the identified character mode.

In one embodiment, the control unit 106 can change a character into a native language if a mode of an identified character is a special character mode. Alternatively, if the input unit 104 includes a touch screen, the control unit 106 according to another embodiment of the present invention may change a character input system of the input unit 104 according to a mode of an identified character. For example, if a character before a cursor is identified as a figure, the control unit 106 may change the character input system into a figure mode.

Figure 2:
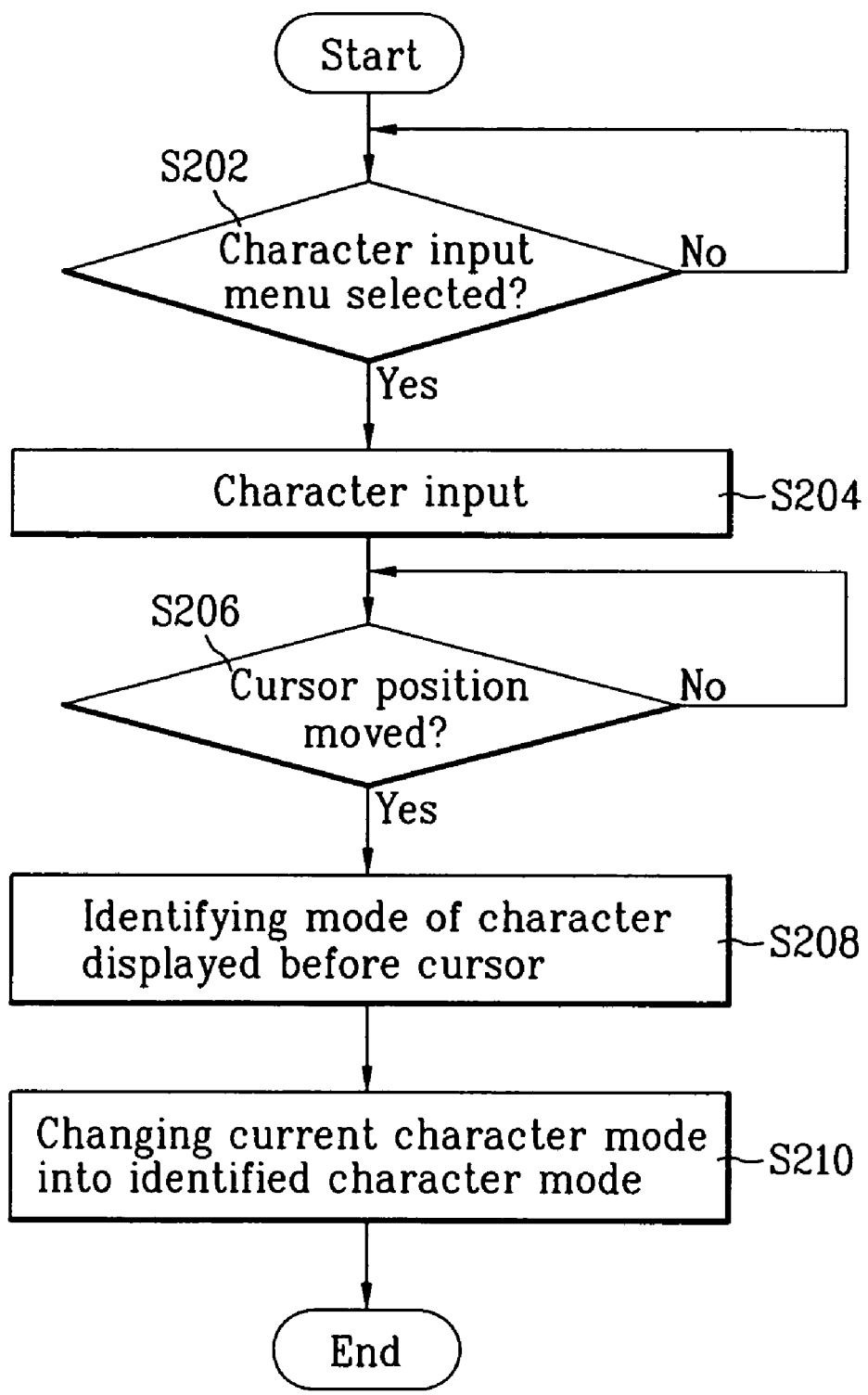
FIG. 2 is a schematic flowchart of a process for changing a character mode according to one embodiment.

Referring to FIG. 2, a limited input device, in response to a user interacting with a user interface of the device, may determine whether a character input menu is selected (S202). If so, characters are inputted to the limited input device (S204). It is decided whether a position of a cursor is moved (S206). For example, the position of the cursor may be moved via a keypad or touch screen. In case of using the keypad, the cursor can be shifted in a right, left, upward or downward direction via a direction key. Alternatively, the cursor can be shifted due to a user deleting a displayed character via a delete, cancel or erase key. In case of using the touch screen, the cursor can be shifted to a designated position depending on the portion of the screen touched by a user.

In response to determining that the position of the cursor is moved, the limited input device identifies the mode of the character located before (e.g., preceding) the cursor (S208), as provided above. In a preferred embodiment, the mode of the character located after the cursor may also be identified. In one embodiment, a user can be informed of the input mode, for example, by enlarging or highlighting the identified character.

As provided in further detail below, the current character mode is changed into the mode of the identified character (S210) automatically and without user intervention, in accordance with one aspect of the invention. For example, if the device is in a figure mode and the character displayed before the cursor is identified as an English capital letter mode, the figure mode is changed into the English capital letter mode.

FIGS. 3A to 3D are exemplary diagrams for explaining a process for changing a character mode on a message input window during message input according to one embodiment.

Figure 3A:
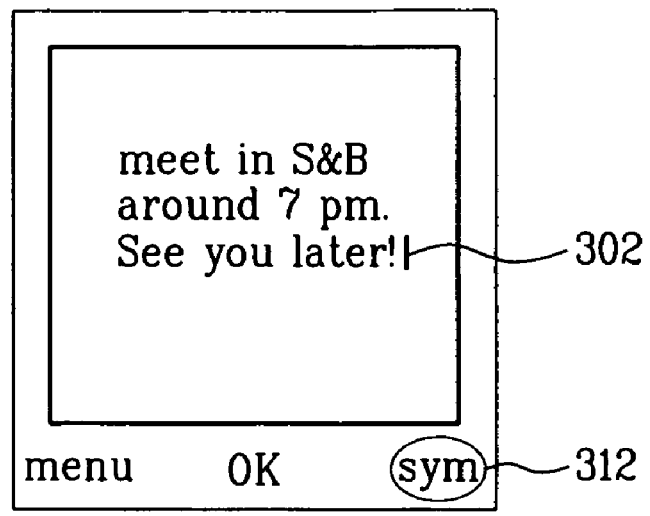
FIGS. 3A to 3D are exemplary diagrams, in accordance with one embodiment, demonstrating the process of switching from a second mode to a first mode.
Figure 3B:
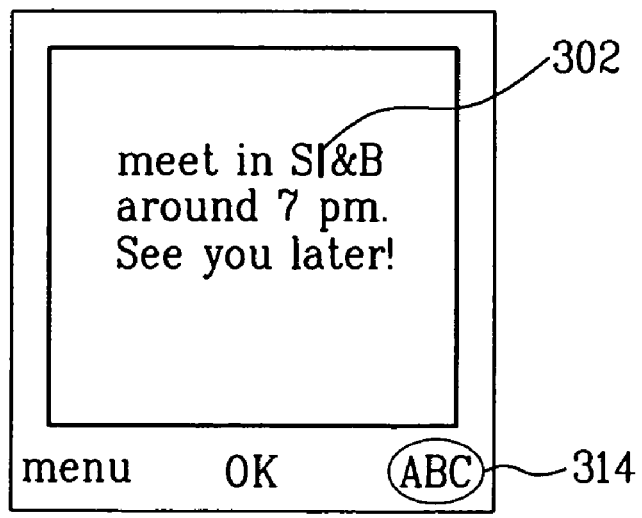
Figure 3C:
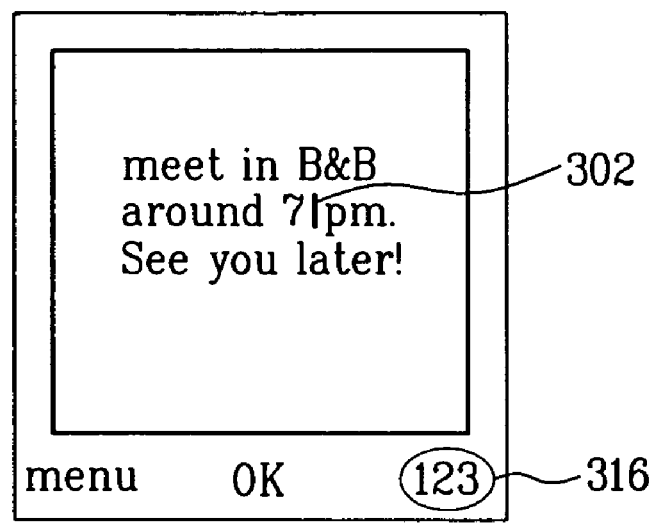
Figure 3D:
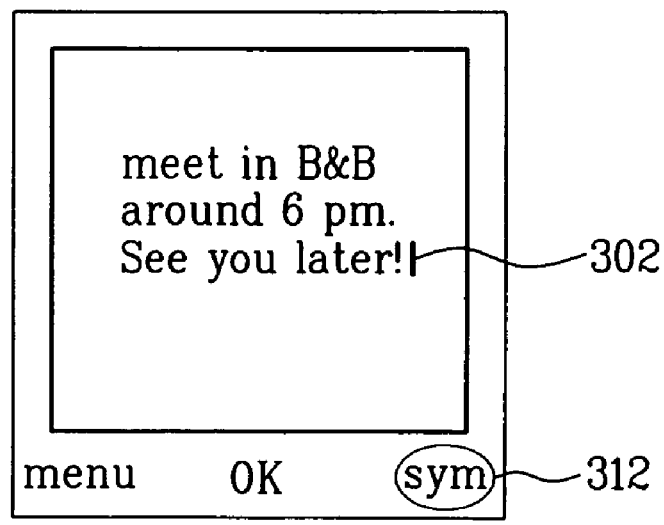

As shown in FIG. 3A, the device is in a first data entry mode 312 (e.g., a special character mode) with cursor 302 positioned after '!'. When cursor 302, as shown in FIG. 3B, is shifted to a position after 'S', the character mode is changed into an English capital letter mode 314. When the cursor 302, as shown in FIG. 3C, is shifted to a position after '7', the character mode is changed into a figure mode 316 from the English capital letter mode 314. After completion of modification, if the cursor, as shown in FIG. 3D, is shifted back to the position succeeding '!', the character mode is switched to the special character mode 312 again.

Accordingly, the character mode is automatically changed in case that the cursor is shifted for character modification or addition. Hence, the present invention requires no additional operation or user interaction for the character mode to change.

Figure 4A:
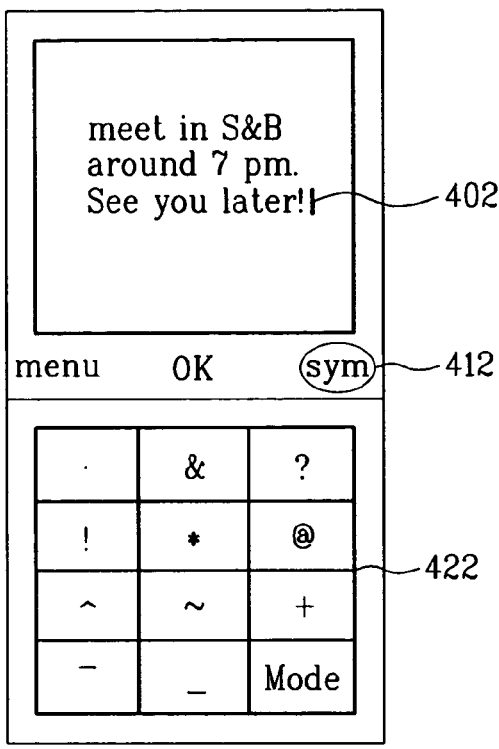
FIGS. 4A to 4D are exemplary diagrams, in accordance with another embodiment, demonstrating the process of switching from a second mode to a first mode.
Figure 4B:
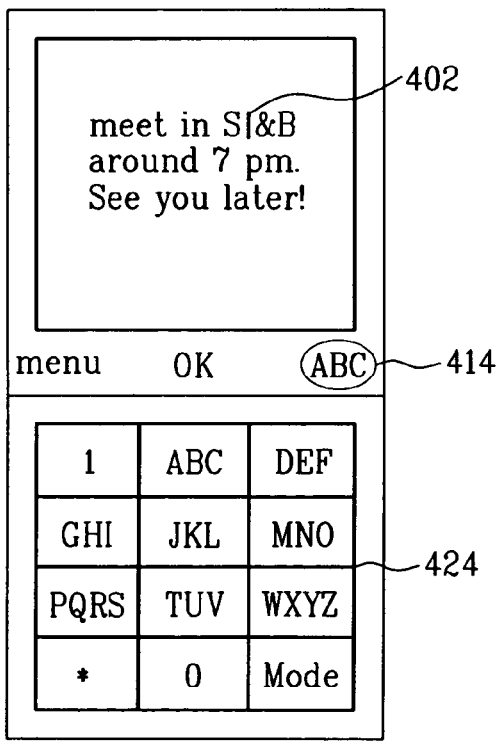

Referring to FIGS. 4A-4D, in another exemplary embodiment, if the mode of a character '!' located before a cursor 402 is a special character mode 412, an input table for special characters menu 422 is displayed on the input unit 104 as shown in FIG. 4A. When the position of the cursor 402 is moved to a position after 'S', the character mode is changed into an English capital letter mode 414 and the character input table displayed on the input unit 104 is changed into English capital letters menu 424, as shown in FIG. 4B.

Figure 4C:
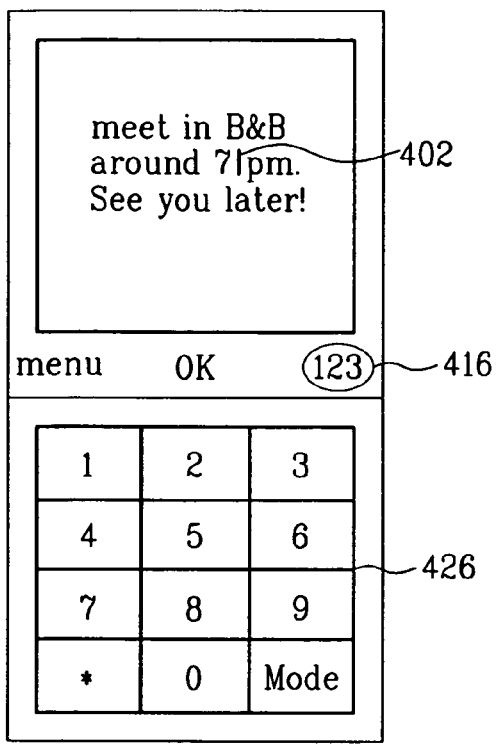
Figure 4D:
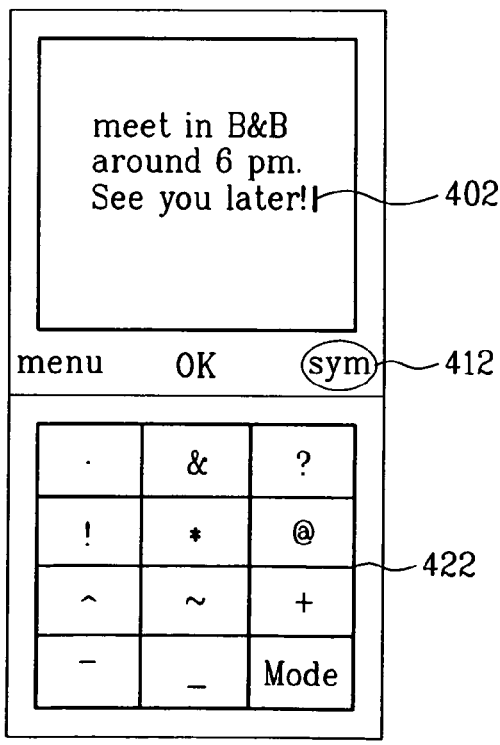

When the cursor 402 is shifted to a position after '7', the character mode is changed into a figure mode 416 and the character input table is switched into input menu 426, as shown in FIG. 4C. And, if the cursor 402 is shifted to a position after the special character '!', the character mode is changed into a special character mode 412 again and the character input table is changed into the special character input menu 422, again, as shown in FIG. 4D.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for modifying attributes of characters in text displayed on a touch screen of a device, the method comprising:
displaying an input table according to a first character attribute at the touch screen;
determining that an input point in the text is repositioned from a first location to a second location, wherein the first location is associated with the first character attribute, and wherein the second location is designated according to a portion of the touch screen touched by a user;
identifying a second character attribute associated with a character located next to the second location and further associated with a character located next to a space character if the character located next to the second location is the space character;
controlling an enlarging or highlighting of a display of the character located next to the second location or the character located next to the space character and associated with the second character attribute, wherein the display of the character located next to the second location or the character located next to the space character is enlarged or highlighted different than a display of all other characters displayed on the touch screen;
changing, independent of operation by the user, a character attribute associated with the second location to match the second character attribute; and
changing, independent of the operation by the user, the input table displayed on the touch screen according to the changed character attribute associated with the second location,
wherein the second character attribute comprises a code including a most significant bit (MSB), and
wherein identifying the second character attribute comprises:
identifying the character located next to the second location or the character located next to the space character as a figure, an English upper-case letter, or an English lower-case letter if the MSB of the code of the second character attribute has a first value; and
identifying the character located next to the second location or the character located next to the space character as a non-English character if the MSB of the code of the second character attribute has a second value.

2. The method of claim 1, further comprising illustrating the input point using a cursor.

3. The method of claim 1, wherein the changed character attribute associated with the second location is alphabetic.

4. The method of claim 1, wherein the changed character attribute associated with the second location is numeric.

5. The method of claim 1, wherein the changed character attribute associated with the second location is a symbol.

6. The method of claim 1, wherein the changed character attribute associated with the second location is a style of the character located next to the second location or the character located next to the space character.

7. The method of claim 1, wherein the changed character attribute associated with the second location is a font of the character located next to the second location or the character located next to the space character.

8. The method of claim 1, wherein the changed character attribute associated with the second location is a color of the character located next to the second location or the character located next to the space character.

9. The method of claim 1, wherein the device is a mobile communication unit.

10. A device comprising:
a touch screen for displaying text and an input point within the text and for generating a signal in response to a user inputting a character; and
a control unit for:
controlling the touch screen to display an input table according to a first character attribute;
determining that the input point within the text is repositioned from a first location to a second location, wherein the first location is associated with the first character attribute and the second location is designated according to a portion of the touch screen touched by the user;
identifying a second character attribute associated with a character located next to the second location and further associated with a character located next to a space character if the character located next to the second location is the space character;
controlling the touch screen to enlarge or highlight a display of the character located next to the second location or the character located next to the space character and associated with the second character attribute, wherein the display of the character located next to the second location or the character located next to the space character is enlarged or highlighted different than a display of all other characters displayed on the touch screen;
changing, independent of operation by a user, a character attribute associated with the second location to match the second character attribute; and
controlling the touch screen, independent of the operation by the user, to change the displayed input table according to the changed character attribute associated with the second location,
wherein the second character attribute comprises a code including a most significant bit (MSB), and
wherein the control unit identifies the second character attribute by:
identifying the character located next to the second location or the character located next to the space character as a figure, an English upper-case letter, or an English lowercase letter if the MSB of the code of the second character attribute has a first value; and
identifying the character located next to the second location or the character located next to the space character as a non-English character if the MSB of the code of the second character attribute has a second value.

11. The device of claim 10, wherein the changed character attribute associated with the second location is a style of the character located next to the second location or the character located next to the space character.

12. The device of claim 10, wherein the changed character attribute associated with the second location is a font of the character located next to the second location or the character located next to the space character.

13. The device of claim 10, wherein the changed character attribute associated with the second location is a color of the character located next to the second location or the character located next to the space character.

14. The device of claim 10, wherein the second character attribute is alphabetic and the first character attribute is non-alphanumeric.

15. A computing device readable medium comprising executable logic code embedded therein, wherein execution of the logic code by a controller of a device causes the controller to:

control a touch screen to display an input table according to a first character attribute;

determine that an input point in text displayed on the touch screen is repositioned from a first location to a second location, wherein the first location is associated with the first character attribute and the second location is designated according to a portion of the touch screen touched by a user;

identify a second character attribute associated with a character located next to the second location and further associated with a character located next to a space character if the character located next to the second location is the space character;

control the touch screen to enlarge or highlight a display of the character located next to the second location or the character located next to the space character and associated with the second character attribute, wherein the display of the character located next to the second location or the character located next to the space character is enlarged or highlighted different than a display of all other characters displayed on the touch screen;

change, independent of operation by the user, a character attribute associated with the second location to match the second character attribute; and control the touch screen, independent of the operation by the user, to change the displayed input table according to the changed character attribute associated with the second location, wherein the second character attribute comprises a code including a most significant bit (MSB), and wherein the controller identifies the second character attribute by:

identifying the character located next to the second location or the character located next to the space character as a figure, an English upper-case letter, or an English lowercase letter if the MSB of the code of the second character attribute has a first value; and identifying the character located next to the second location or the character located next to the space character as a non-English character if the MSB of the code of the second character attribute has a second value.

* * * * *